United States Patent [19]

Bauman et al.

[11] Patent Number: 5,389,349
[45] Date of Patent: Feb. 14, 1995

[54] RECOVERY OF LITHIUM VALUES FROM BRINES

[76] Inventors: William C. Bauman, 1015 Balfour St., Midland, Mich. 48640; John L. Burba, III, 232 Rabbit Trail, Lake Jackson, Tex. 77566

[21] Appl. No.: 65,586

[22] Filed: May 24, 1993

[51] Int. Cl.$^6$ .................. C01D 15/00; B01J 20/00; C09K 3/00
[52] U.S. Cl. .................. 423/179.5; 423/181; 502/415; 252/184
[58] Field of Search ............ 252/184; 502/415; 423/179.5, 181

[56] References Cited

U.S. PATENT DOCUMENTS

| | | | |
|---|---|---|---|
| 4,116,856 | 9/1978 | Lee et al. | 252/184 |
| 4,116,858 | 9/1978 | Lee et al. | 252/184 |
| 4,159,311 | 6/1979 | Lee et al. | 423/179.5 |
| 4,221,767 | 9/1980 | Lee et al. | 423/179.5 |
| 4,291,001 | 9/1981 | Repsher et al. | 423/179.5 |
| 4,347,327 | 9/1982 | Lee et al. | 521/28 |
| 4,348,295 | 9/1982 | Burba, III | 252/184 |
| 4,348,296 | 9/1982 | Bauman et al. | 252/184 |
| 4,348,297 | 9/1982 | Bauman et al. | 252/184 |
| 4,376,100 | 3/1983 | Lee et al. | 423/179.5 |
| 4,381,349 | 4/1983 | Lee et al. | 521/28 |
| 4,430,311 | 2/1984 | Lee et al. | 423/179.5 |
| 4,461,714 | 7/1984 | Burba, III | 252/184 |
| 4,472,362 | 9/1984 | Burba, III | 423/179.5 |
| 4,477,367 | 10/1984 | Burba, III | 252/184 |
| 4,540,509 | 9/1985 | Burba, III | 252/184 |
| 4,727,167 | 2/1988 | Burba, III et al. | 252/184 |

OTHER PUBLICATIONS

W. C. Bauman et al "Structure and Operation of Dow's New Lithium–Selective Ion–Exchange Resin" published in 1985 by John Wiley & Sons in *Lithium–Current Applications in Science, Medicine and Technology.*

*Primary Examiner*—Gary P. Straub
*Assistant Examiner*—Steven Bos

[57] ABSTRACT

Morphologically altered pellets of a polycrystalline hydrated alumina, intercalated with LiX (where LiX is a lithium salt, preferably LiCl), is prepared by contacting the polycrystalline structure with LiX solution carried in NaCl brine, the LiX creating lithium-specific sites of intercalation in the crystalline structure, and the material is used in a LiX absorption process involving unloading LiX from the pellets, and then passing a LiX-containing brine through the pellets to capture more LiX in the Li-depleted active sites, and repeating the unloading and loading of the LiX a plurality of cycles. The unloaded LiX is collected as crude product which can be concentrated by evaporation and removing precipitated NaCl.

18 Claims, No Drawings

RECOVERY OF LITHIUM VALUES FROM BRINES

FIELD OF THE INVENTION

Lithium values are recovered, by an ion-exchange process, from lithium-containing brines using, as the ion-exchange material, polycrystalline hydrated alumina pellets containing at least one lithium compound intercalated in the crystals.

BACKGROUND OF THE INVENTION

Previous methods of extracting lithium values from brines which contain lithium are disclosed in the following U.S. Pat. Nos. 4,116,856; 4,116,858; 4,159,311; 4,221,767; 4,291,001; 4,347,327; 4,348,295; 4,348,296; 4,348,297; 4,376,100; 4,381,349; 4,430,311; 4,461,714; 4,472,362; and 4,477,367. These patents pertain, in various ways, to creating lithium aluminates within the interstices or pores of ion exchange resins, or on other substrates, porous and non-porous. Microcrystalline lithium aluminates formed within ion exchange resins are useful in selectively removing lithium values from Li-containing brines. Over the years, it has been found that ion exchange resin compositions were often fouled by substances in the brine, such as hydrocarbon contaminants, that rendered the ion exchange resin incapable of rejuvenation requiring manufacture of resin.

In *Lithium—Current Applications in Science, Medicine and Technology*, R. O. Bach Editor, published by John Wiley and Sons, 1985, there is a paper on pp. 29-34, by W. C. Bauman, J. L. Burba, and J. M. Lee, titled "Structure and Operation of Dow's New Lithium-Selective Ion-Exchange Resin" containing background information of some relevance to the subject matter of this present disclosure.

The present invention offers improvements in costs and availability of materials for recovering lithium values from brines. The hydrated alumina pellets of the present invention are so inexpensive, compared with ion exchange resins, that it is more cost effective to discard spent hydrated alumina than to rejuvenate it. Also, the preparation of the lithium-capturing pellets of the present invention is relatively simple and easily managed in situ in a vessel in which it is to be used, though it can be prepared in one vessel and then transferred to another vessel for use. A more concentrated and more pure LiX product can be prepared, as compared to the known use of ion exchange resins.

SUMMARY OF THE INVENTION

This invention comprises a composition, its preparation, and its use as a means for recovering lithium values from brines in an ion-exchange process.

The composition comprises pellets of an integral mass of polycrystalline hydrated alumina which has been morphologically altered by the intercalation therein of LiX (lithium salt), which creates active lithium-specific sites within the crystal layers. The lithium-specific sites remain active even upon washing some, or even all, of the LiX out of the morphologically altered crystals, though if is often preferred to leave a small amount of LiX in the active sites.

The altered polycrystalline pellets are prepared by a process comprising substantially filling the void volume first with concentrated NaCl brine which carries LiX so as to have the LiX infused into the polycrystalline mass to establish a mass essentially loaded with intercalated LiX. The alteration imparts the active sites within layers of at least some of the crystal layers, but is not an alteration that is enough to cause any substantial breaking apart of the polycrystalline structure, and the sites selectively extract LiX from LiX-containing brines.

The so-formed polycrystalline pellets are used in selectively removing lithium from lithium-containing brine in a process comprising repeated loading and unloading of the active sites, using water or water which contains some LiX for the unloading steps, and LiX-containing concentrated brine for the loading steps. The unloaded LiX is saved.

While the following descriptions are directed primarily to recovering LiX from NaCl brine, which is preferred, other metal salt brines which contain LiX, such as $CaCl_2$, $MgCl_2$, and KCl, can demonstrate some operability in accordance with this invention.

DETAILED DESCRIPTIONS INCLUDING BEST MODE CONTEMPLATED

As used in this disclosure, the term "concentrated NaCl" brine or solution is meant to include saturated NaCl brine or solution. Any excess water in the brine during loading of the sites is counter-productive because the excess water tends to prevent the lithium values from staying with the active sites; thus saturated NaCl brine is preferred.

The temperatures used in the process steps of loading and unloading of LiX in the pellets are selected in the upper end of the range, i.e., ambient up to about the boiling point. Intercalation of the LiX into the polycrystalline hydrated alumina is more efficient in the upper part of the temperature range because of kinetics.

The composition comprises pellets of an integral mass of polycrystalline hydrated alumina in which a portion, at least, of crystals in the pellets are substantially intercalated with LiX (lithium salt). The desired degree of intercalation into the polycrystalline structure is not great enough to cause deleterious amounts of lattice expansion in the polycrystalline mass causing decrepitation of the pellets into tiny particles which become easily packed during downflow of liquids in an exchange vessel or are easily carried out of the vessel during upflow of liquid through the vessel. Upon repeated cycles of upflow and downflow of liquids through the vessel, some breaking of the pellets into small particles can occur through attrition and collision of particles. Generally speaking, the polycrystalline pellets remain substantially intact and the pellets remain easily filterable and non-packing during many cycles. The degree of the intercalation is not enough to fully expand the crystals and form crystalline lithium aluminum hydroxy halide.

The LiX-containing polycrystalline mass is prepared by substantially filling the pellets with concentrated NaCl brine to fill voids, especially the voids between the pellets in the bed. When the NaCl brine is added initially to the bed of pellets, it is preferred that it be added in upflow manner so as to remove any very fine particles which may be present and to classify the pellets in the bed. The classified bed promotes even distribution of the fluid flow.

The initial charging of LiX is done by circulating concentrated (preferably saturated) NaCl through the bed of polycrystalline $Al(OH)_3$. The appropriate molar quantity of LiX is added to the brine during circulation. Circulating continues until the LiX is absorbed in the Al(OH)$_3$ crystals. This forms lithium-specific exchange sites. LiX absorption can be accomplished by cycles of loading of LiX into the pellets of hydrated alumina in the bed, and unloading of most, but not necessarily all, of the LiX from the bed. While the LiX is normally being removed from a relatively strong solution of NaCl brine, it is preferred, in many instances, to supplement the amount of NaCl naturally occurring in the brine by adding more NaCl, such as by contacting the brine with rock salt.

The so-formed polycrystalline pellets containing the intercalated LiX are useful in selectively removing LiX from LiX-containing brine.

There are a number of brines in various places in the world which are relatively high in the concentration of LiX, especially where X represents a halogen, especially chloride. When the brine is evaporated seawater, then there is a high concentration of NaCl, with all other metal halide values being of lower concentration. Other brines often are found to have more LiX and other metal salts than found in evaporated seawater. An artificial brine can also be prepared by leaching either roasted or unroasted spodumene with a salt solution.

In this disclosure the LiX of greatest interest is LiCl, and the brines of greatest interest, besides seawater, are subterranean brines, such as that from the Smackover formation which runs largely through Arkansas and into Texas.

In preparing the unique compositions of this invention, there is selected a polycrystalline hydrated alumina of particle size which is suitable for use in a column without encountering excessive packing and blinding which interferes with efficient flow of liquids through a bed of the particles. Preferably polycrystalline pellets of hydrated alumina known as crystalline Gibbsite is used, such as that which is commercially available as LaRoche H-30 TM, Reynolds Metal RH-30 TM, and Alcoa C-30 TM. Other polycrystalline pellets can be used, such as those made from Bayerite, Norstrandite or Bauxite. The process known as the Bayer process is used to manufacture polycrystalline hydrated alumina from various alumina-containing ores or minerals (usually bauxite) to make a coarse product which is suitable for use in this invention. Preferably the particle size of the pellets is not smaller than about 140 mesh, U.S. standard sieve size, and can be as large as about 10 mesh U.S. standard sieve size.

As used herein, in reference to the amount of LiX intercalated into the crystals, an amount of 0.02 LiX/Al(OH)$_3$ mol fraction would not be expected to be very efficient. In order to avoid overloading crystals to the point of deleteriously fracturing of the polycrystalline structure, the LiX/Al(OH)$_3$ mol fraction should be kept below about 0.2. Preferably the range of the mol fraction is about 0.05 to about 0.16. Most preferably the range is about 0.08 to about 0.1.

The preferred LiX is LiCl, though other soluble inorganic salts of lithium can be used, such as where X represents bromide, iodide, nitrate, sulfate, bicarbonate, and the like.

Bed Preparation:

In general, the process for generating the intercalation of the crystals of the polycrystalline hydrated alumina, also known as Al(OH)$_3$, may normally begin with upflow of brine, water or air to expand the bed of hydrated alumina pellets and to classify the particles to facilitate the removal of fines.

Saturated NaCl solution is circulated through the classified bed for a time or amount to substantially remove the fluid used for the classification step.

A concentrated aqueous solution of LiX (preferably LiCl) is added to the circulating saturated NaCl solution, preferably at a temperature above ambient, but not more the boiling point, while keeping the NaCl solution saturated, preferably by flowing it through a bed of rock salt. At least a portion of the LiX flowing through the bed permeates at least a beneficial amount of the crystal layers of the pellets, but not an amount which is sufficient to fracture the pellets. At the same time the pellets are still covered with saturated NaCl. The LiX which is intercalated in the crystal layers can also carry up to two moles of water per mole of LiX. The flow of LiX solution is continued until the desired amount of LiX has been added to the circulating NaCl solution. The circulation of the NaCl solution is continued until the level of LiX it carries has been reduced substantially to a very low level, as can be shown by analyses of samples taken over a period of time. The so-prepared pellets can be stored or used immediately in the next step toward full cycling in an unload-load operation.

Operation of Bed to Recover LiX from a Brine Source:

The following steps illustrate, in general, an operation of the unloading and loading of the pellets:

(a) In using the pellets of polycrystalline hydrated alumina which have been altered to have intercalation sites containing LiX, the bed as prepared above is flushed, downflow, with a predetermined bed volume of a LiX solution to displace the hold-up of NaCl solution. The effluent can be returned to the saturated NaCl solution storage.

(b) The flow of LiX solution is continued with a predetermined bed volume of LiX solution, and the effluent can be saved as product.

(c) Displace the hold-up of LiX solution in the bed with a predetermined bed volume of concentrated NaCl solution and save the effluent as product.

(d) Displace the hold-up of concentrated NaCl solution with a predetermined bed volume of brine which contains LiX and return the effluent to the concentrated NaCl solution storage.

(e) Flow of the LiX-containing brine, preferably at a temperature in the range of ambient, but below the boiling point. Continue until LiX breakthrough as determined by analyses. It is generally preferable to saturate the LiX-containing brine with NaCl at the operating temperature, such as by passing it through a bed of rock salt.

(f) Drain brine to bed level and displace the brine hold-up downflow with a predetermined bed volume of saturated NaCl, preferably at a temperature in the range of ambient to not more than the boiling point of the solution.

(g) Repeat steps (a) through (f) a plurality of times.

The product from the (b) and (c) steps can be concentrated to 36% by evaporation, preferably at elevated temperature, cooled to room temperature and crystallized NaCl removed by settling and filtration.

The following particular embodiments are provided to illustrate the invention, but the invention is not limited to only the particular examples shown.

EXAMPLE 1

(bed preparation):

Into a column is loaded an amount of polycrystalline hydrated alumina pellets, available as a commercial product identified as LaRoche H-30 Gibbsite, which fills enough of the column to allow for 50% bed expansion during upflow of brine through the column without losing pellets in the overflow from the top, except for very small fines which may be in the pellets.

Fill the column with saturated aqueous NaCl solution at about 50° C. and circulate the NaCl solution at a rate to give about 50% bed expansion of the pellets and maintain the rate of flow until the bed is classified and any fine particles are removed, leaving in the column pellets which are substantially of a size in the range of >140 to <10 U.S. Standard sieve size.

Circulate saturated NaCl solution downflow at about 50° C. through the classified bed, maintaining saturation by including a bed of NaCl crystals in the circulating flow.

Add 36% LiCl solution to the circulating flow of saturated NaCl at a rate to provide about 0.05 to 0.1 mol LiCl per mol of Al(OH)$_3$ over a period of about 4 hours; this gives an initial "loading" of the LiCl intercalated in the crystals.

Continue circulating the NaCl solution, with only a small amount of LiCl in it, until LiCl is absorbed.

Drain the bed to eliminate overhead NaCl solution, leaving the pellets, still wet with held-up NaCl solution, in the column. The bed is now ready for use in the recovery of LiCl from brine.

EXAMPLE 2

(Use of LiX-intercalated Al(OH)$_3$ bed to recover LiCl from brine)

(a) Displace the hold-up NaCl solution downflow with 0.36 bed volumes of 20% LiCl at a temperature in the range of about 25° C. to about 90° C.; return the effluent of saturated NaCl solution to storage; it is useful for further cycling through the bed.

(b) Continue downflow with an additional 0.36 bed volumes of 1% to 20% LiCl solution and save the effluent as product.

(c) Displace the hold-up of 1% to 20% LiCl downflow with 0.36 bed volumes of saturated NaCl and save the effluent as product.

(d) Displace the hold-up of saturated NaCl downflow with 0.36 bed volumes of natural brine which contains the LiCl to be recovered; return the effluent to saturated NaCl solution storage.

(e) Upflow the natural brine at a temperature in the range of 50° C. to 100° C. at a flow rate to give 50% bed expansion and continue until LiCl breakthrough. (It is generally preferable to saturate the natural brine with NaCl at the operating temperature by passing it through a bed of NaCl, such as rock salt.)

(f) Drain brine to bed level, Displace brine hold-up down-flow with 0.36 bed volumes of saturated NaCl at 25° C. to 50° C.

(g) Repeat steps (a) through (f) a plurality of cycles, each cycle collecting the products of (b) and (c). Concentrate LiCl product by evaporation to about 36% LiCl, cool to room temperature and remove crystallized NaCl by setting and filtration.

Particular embodiments other than the above may be employed by others, upon learning of this invention, without departing from the inventive concept expressed in this disclosure. Our invention is limited only by the concept embodied in the claims which follow.

We claim:

1. A composition consisting essentially of pellets, each of said pellets consisting essentially of an integral mass of polycrystalline material of randomly disposed crystals of hydrated alumina intercalated with LiX in an amount to provide a mol fraction of LiX/Al(OH)$_3$ of not less than about 0.02, nor more than 0.2, wherein LiX is at least one compound selected from the group consisting of Li halide, Li nitrate, Li sulfate, and Li bicarbonate, said pellets being of a particle size not smaller than about 140 United States Standard Sieve Size.

2. The composition of claim 1 wherein the LiX is LiCl.

3. The composition of claim 1 wherein the amount of intercalated LiX is in the range of about 0.05 to about 0.16 LiX/Al(OH)$_3$ mol fraction.

4. The composition of claim 1 wherein the amount of intercalated LiX is in the range of about 0.08 to about 0.1 LiX/Al(OH)$_3$ mol fraction.

5. The composition of claim 1 wherein the polycrystalline material is at least one selected from the group consisting of Gibbsite, Bauxite, Norstrandite, and Bayerite.

6. The composition of claim 1 wherein the polycrystalline material is Gibbsite.

7. The composition of claim 1 wherein the particle size of the pellets is within the range of >140 to <10 United States Standard Sieve Size.

8. A method of preparing the polycrystalline hydrated alumina pellets of claim 1, said method comprising contacting pellets of polycrystalline hydrated alumina with concentrated NaCl solution containing enough LiX to form partially expanded hydrated alumina having a LiX/Al(OH)$_3$ mol fraction of LiX of not more than about 0.2 nor less than about 0.02.

9. The method of claim 8 wherein the LiX is at least one selected from the group consisting of lithium halide, lithium nitrate, lithium sulfate, and lithium bicarbonate.

10. The method of claim 8 wherein the LiX is lithium chloride.

11. The method of claim 8 wherein concentrated NaCl solution is saturated NaCl solution.

12. The process of recovering LiX from brine, said process comprising (a) positioning in a recovery vessel a predetermined bed volume of pellets of the composition of claim 1, said pellets comprising polycrystalline hydrated alumina containing intercalated LiX, (b) passing LiX-containing brine through the bed of pellets until the pellets are loaded with additional LiX from the brine, (c) displacing brine held-up in the bed by using concentrated NaCl, (d) unloading LiX from the pellets by flowing through the bed an aqueous solution of LiX which is not saturated, (e) displacing the LiX from the bed using concentrated NaCl, and (f) repeating the sequence of steps (b) through (e) a plurality of times.

13. The process of claim 12 wherein the concentrated NaCl is saturated NaCl, and which is kept saturated by additional NaCl.

14. The process of claim 12 wherein the lithium values are of LiX, where X is halide, nitrate, sulfate, or bicarbonate.

15. The process of claim 12 wherein the LiX is LiCl.

16. The process of claim 12 wherein the LiX-containing brine is naturally-occurring Smackover brine.

17. The process of claim 12 wherein the LiX-containing brine is synthetic brine obtained by brine leaching of spodumene, whether the spodumene be roasted or not roasted.

18. The process of claim 12 wherein the polycrystalline hydrated alumina is at least one of the group consisting of Gibbsite, Bauxite, Bayerite, and Norstrandite.

* * * * *